(12) United States Patent
Yu et al.

(10) Patent No.: US 12,215,467 B2
(45) Date of Patent: Feb. 4, 2025

(54) INTEGRATE STRUCTURE FOR DAMAGE MANAGEMENT OF ROAD-BRIDGE TRANSITION SECTIONS IN PERMAFROST REGIONS

(71) Applicant: Northwest Institute of Eco-Environment and Resources, Chinese Academy of Sciences, Gansu (CN)

(72) Inventors: Qihao Yu, Gansu (CN); Zhenyu Zhang, Gansu (CN); Dangzhan Wang, Gansu (CN); Yaojun Zhao, Gansu (CN); Xinbin Wang, Gansu (CN); Delong Zhang, Gansu (CN)

(73) Assignee: Northwest Institute of Eco-Environment and Resources, Chinese Academy of Sciences, Gansu (CN)

( * ) Notice: Subject to any disclaimer, the term of this patent is extended or adjusted under 35 U.S.C. 154(b) by 0 days.

(21) Appl. No.: 18/659,853

(22) Filed: May 9, 2024

(65) Prior Publication Data

US 2024/0410115 A1 Dec. 12, 2024

(30) Foreign Application Priority Data

Jun. 6, 2023 (CN) .......................... 202310663808.7

(51) Int. Cl.
*E01C 3/06* (2006.01)
(52) U.S. Cl.
CPC ...................... *E01C 3/06* (2013.01)
(58) Field of Classification Search
CPC ....................................................... E01C 3/06

USPC ........................................................ 405/130
See application file for complete search history.

(56) References Cited

U.S. PATENT DOCUMENTS

| 1,704,577 | A | * | 3/1929 | Pomykala | ................. | E21D 1/14 |
| | | | | | | 405/130 |
| 4,966,493 | A | * | 10/1990 | Rebhan | ..................... | B09C 1/00 |
| | | | | | | 62/260 |
| 5,416,257 | A | * | 5/1995 | Peters | ..................... | E02D 19/14 |
| | | | | | | 588/1 |
| 5,636,457 | A | * | 6/1997 | Eriksson | ................... | F25C 1/08 |
| | | | | | | 405/303 |

(Continued)

FOREIGN PATENT DOCUMENTS

| CN | 102454143 | A | * | 5/2012 | ............ | E01C 11/226 |
| CN | 206928155 | | | 1/2018 | | |

(Continued)

*Primary Examiner* — Tara Mayo
(74) *Attorney, Agent, or Firm* — CKC & Partners Co., LLC

(57) ABSTRACT

The present invention provides an integrated structure for damage management of road-bridge transition sections in permafrost regions, including a plurality of slope surface cooling blocks, a plurality of horizontal equilibrium condensing tubes, and a plurality of cooling flanges and targeting heat pipe arrays. The plurality of slope surface cooling blocks are arranged on the surfaces of the subgrade slope and abutment conical slope; the plurality of horizontal equilibrium condensing tubes are installed inside the abutment-back subgrade; the plurality of cooling flanges are arranged on the side wall of the abutment; the targeting heat pipe arrays are arranged on one side of the subgrade and close to the abutment foundation.

6 Claims, 4 Drawing Sheets

(56) References Cited

U.S. PATENT DOCUMENTS

| | | | | |
|---|---|---|---|---|
| 5,681,130 A | * | 10/1997 | Aines et al. | E21B 43/24 |
| | | | | 588/1 |
| 9,631,328 B2 | * | 4/2017 | van Raam et al. | E01C 3/006 |
| 2007/0163186 A1 | * | 7/2007 | Baugh et al. | E02D 27/35 |
| | | | | 405/195.1 |
| 2011/0243659 A1 | | 10/2011 | Wang et al. | |
| 2012/0163911 A1 | * | 6/2012 | Culleton et al. | E01C 3/006 |
| | | | | 404/72 |
| 2014/0133918 A1 | * | 5/2014 | Hardman | E01C 13/105 |
| | | | | 405/130 |
| 2014/0270944 A1 | * | 9/2014 | White | E01C 11/224 |
| | | | | 404/27 |

FOREIGN PATENT DOCUMENTS

| | | |
|---|---|---|
| CN | 109706813 | 5/2019 |
| CN | 110241672 | 9/2019 |
| CN | 110565466 | 12/2019 |
| CN | 216006466 | 3/2022 |
| CN | 216947683 | 7/2022 |

\* cited by examiner

INTEGRATE STRUCTURE FOR DAMAGE MANAGEMENT OF ROAD-BRIDGE TRANSITION SECTIONS IN PERMAFROST REGIONS

CROSS-REFERENCE TO RELATED APPLICATIONS

This non-provisional application claims priority under 35 U.S.C. § 119 (a) on patent application No. 202310663808.7 filed in P.R. China on Jun. 6, 2023, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The present invention relates to the technical field of foundation temperature regulation and control for road-bridge transition sections in permafrost regions, in particular to an integrated structure for damage management of road-bridge transition sections in permafrost regions.

2. Related Art

Permafrost is a kind of soil and rock with a temperature lower than 0° C. and containing ice. The mechanical strength of permafrost will change greatly with the temperature change: the lower the temperature, the greater the strength of permafrost. When the temperature is lower than −1.5° C., its instantaneous compressive strength is equivalent to that of ordinary rocks; when the temperature is higher than −0.5° C. to 0° C., its compressive strength is equivalent to that of ordinary soil blocks or even basically lost. In permafrost regions, subgrade engineering is faced with serious engineering problems such as thaw settlement caused by thawing of permafrost.

The road-bridge transition section refers to the transition section where the filled embankment is transformed into a bridge in road engineering such as highways and railways. It mainly consists of a certain range (about 20 m~50 m) of embankment behind the abutment, pile foundation, abutment and fan-shaped fill on both sides of the abutment. The complex spatial structure is a prominent feature of the transition section; in addition, the different structures and poor vertical stiffness make the transition section become a high damage prone section of road engineering. In permafrost regions, the existence of multiple heat-absorbing surfaces such as subgrade slope surfaces, conical slopes, abutments, and abutment side walls makes the process of heat absorption and transfer more intense. This will not only lead to uneven settlement of the transition section but also cause horizontal displacement of the abutment outward along the subgrade direction due to the frost-heaving force generated by the freezing-thawing action behind the abutment, causing extrusion and damage to bridges, supports and other structures. Therefore, it has an important impact on the stability of the transition section. For example, the Qinghai-Tibet Railway passes through 550 km of permafrost regions. During the 15 years of operation of the Qinghai-Tibet Railway, the damage incidence rate of road-bridge transition sections in the hinterland of permafrost reached 70~80%, which seriously threatened the safety of Qinghai-Tibet Railway operation.

To solve those problems, in the remediation works of Qinghai-Tibet Railway, common engineering measures or combinations such as using crushed-rock slope and inserting heat pipes at the toe of conical slope are adopted (Saize Zhang, 2021). The site situation is shown in FIG. 1. From the above damage analysis of the road-bridge transition sections, the damage management of the transition sections is an integral project that requires comprehensive consideration of subgrade, conical slope and abutment. However, the previous damage management methods for road-bridge transition sections lack the concept of integrated treatment. Even if engineering measures such as crushed-rock slope and heat pipes are used at the same time, effective and coordinated comprehensive cooling effects cannot be formed between various measures due to the unreasonable layout location and mode of these measures or insufficient cooling efficiency. At the same time, there is no temperature regulation on the heat-absorbing surfaces such as the abutment surface and side wall. Therefore, it is difficult to effectively control the temperature of permafrost under the transition section by previous measures, and the damages in the road-bridge transition sections still exist for a long time.

To sum up, the solution of damages in the road-bridge transition sections requires not only innovation in specific treatment measures but also comprehensive layout and coordination from the whole transition sections.

SUMMARY OF THE INVENTION

The technical problem to be solved by the present invention is to provide an integrated structure for damage management of road-bridge transition sections in permafrost regions, which can realize rapid and balanced cooling.

To solve the above problems, the present invention presents an integrated structure for damage management of road-bridge transition sections in permafrost regions, characterized in that: the integrated structure includes a plurality of slope surface cooling blocks, a plurality of horizontal equilibrium condensing tubes, and a plurality of cooling flanges and targeting heat pipe arrays; the plurality of slope surface cooling blocks are arranged on the surfaces of the subgrade slope and the abutment conical slope; the plurality of horizontal equilibrium condensing tubes are installed inside the abutment-back subgrade; the plurality of said cooling flanges are arranged on the abutment side wall; the targeting heat pipe arrays are arranged on one side of the subgrade and close to the abutment foundation.

The slope surface cooling blocks cover the entire surface of the abutment conical slope and extend outward for 2 m~4 m along the natural ground surface at the slope angle.

The slope surface cooling blocks are arranged on the slope of the subgrade slope, and the laying length along the subgrade direction is 20 m~50 m behind the abutment.

The plurality of horizontal equilibrium condensing tubes are arranged inside the horizontal subgrade behind the abutment and staggered in upper and lower layers along the height of embankment; the horizontal spacings of the horizontal equilibrium condensing tubes in the two layers are the same, both being 1 m~3 m; the horizontal equilibrium condensing tubes in the lower layer are arranged on the bottom surface of the embankment, and a spacing between the horizontal equilibrium condensing tubes in the upper and lower layers is 0.5 m~2.0 m.

Each cooling flange is vertically installed at the side wall of the abutment, and pasted or anchored by thermal conductive adhesive; the horizontally adjacent cooling flanges are in contact with each other, and the vertically adjacent cooling flanges reserve a space for a heat release section.

The cooling flange includes a shading flake, an insulation layer and a heat pipe unit; one side of the shading flake is exposed, and the other side thereof is connected with the insulation layer, and the insulation layer is connected with the heat pipe unit; the heat pipe unit is vertically adhered or anchored on the abutment side wall by the thermal conductive adhesive.

The targeting heat pipe array consists of a plurality of variable-angle heat pipes in evaporation sections; the evaporation section is buried below the ground surface; and the condensation section of the heat pipes is directly inserted above the ground surface at a vertical angle.

The plurality of heat pipes are distributed in an approximately symmetrical fan shape along the toe line of the abutment conical slope with the center of the abutment foundation as the axis.

The evaporation section faces the abutment foundation, and a horizontal projection position of an end of the evaporation section is located outside the abutment foundation; at the same time, the evaporation section and the condensation section form an included angle of α, α=90°~180°.

The included angle α is determined as follows:

$$\alpha = \arccos\left(\frac{l}{L}\right);$$

Where: l is the horizontal distance from the buried position of the heat pipe to the outer side of the abutment foundation; L is the length of the evaporation section.

Compared with the prior art, the present invention has the following advantages:

1. The present invention proposes the technical concept of road-bridge transition section integration for the first time. This integrated technology is used to carry out comprehensive prevention and control at key nodes of damage management in road-bridge transition sections. Measures at different regulation positions exert different cooling effects, and different measures are coordinated with each other to form an organic whole, thus multiplying the overall cooling effect of the integrated technology and effectively solving complex heat transfer and regulation problems on multiple heat absorption surfaces such as subgrade slope, conical slope, abutment and abutment side wall.

2. To solve the key technical problems of subgrade stability in the road-bridge transition sections of the Qinghai-Tibet Railway, the present invention realizes the rapid recovery of freezing force and bearing capacity of subgrade base and abutment base through horizontal condensing tubes and targeted heat pipe array technology, thus effectively eliminating the long-term continuous settlement problem of subgrade and abutment; through the slope surface cooling block and abutment sunshade flange, most areas of the abutment and subgrade behind it remain frozen all year round, thus greatly reducing the freezing-thawing area inside the subgrade and eliminating the horizontal driving effect of freezing-thawing frost heaving force behind the abutment, thus ensuring the long-term stability of key nodes of railway engineering road-bridge transition sections in permafrost regions.

BRIEF DESCRIPTION OF THE DRAWINGS

Embodiments of the present invention will be further described in detail below in conjunction with the accompanying drawings.

Figure 1:
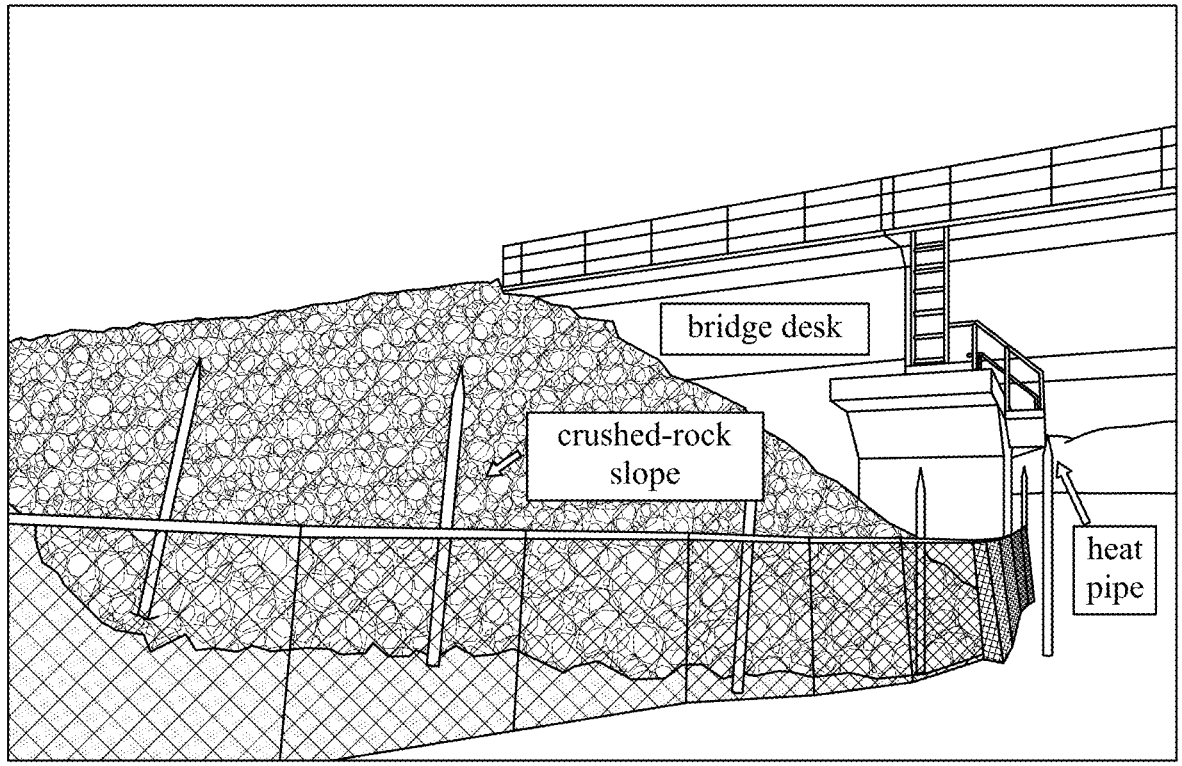
FIG. 1 illustrates traditional engineering measures for the road-bridge transition section.
Figure 2:
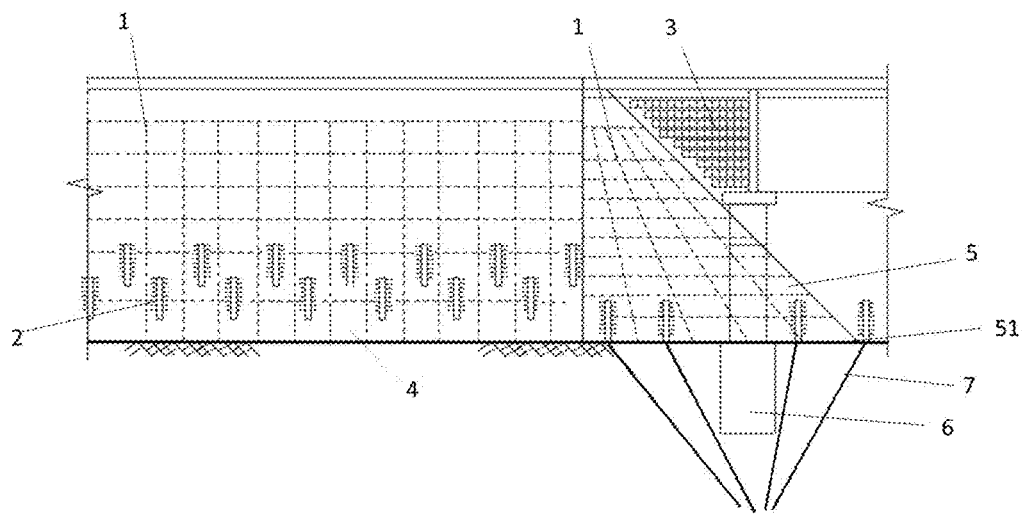
FIG. 2 is a side view of the present invention.
Figure 3:
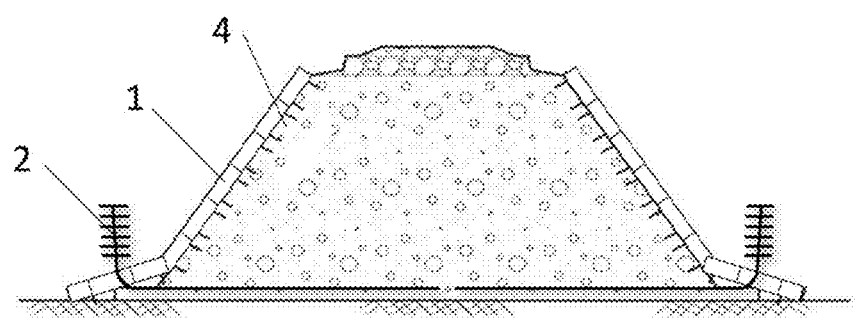
FIG. 3 is a schematic cross-sectional view of the present invention.
Figure 4:
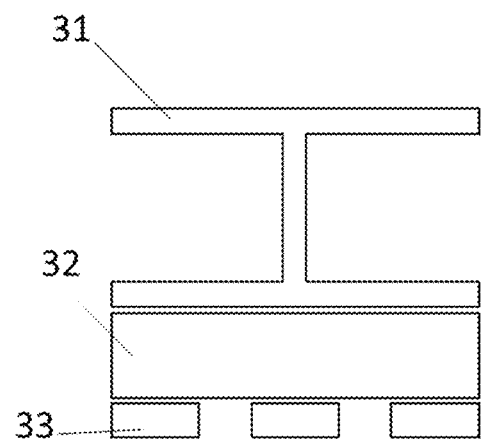
FIG. 4 is a schematic diagram of the cooling flange of the present invention.

In the figure: 1—slope surface cooling block, 2—horizontal equilibrium condensing tube, 3—cooling flange, 31—shading flake, 32—insulation layer, 33—heat pipe unit, 4—subgrade slope, 5—abutment conical slope, 51—toe of abutment conical slope, 6—abutment foundation, 7—targeting heat pipe array, 72—evaporation section, 71—condensation section.

DETAILED EMBODIMENTS OF THE INVENTION

As shown in FIG. 2~FIG. 6, an integrated structure for damage management of road-bridge transition sections in permafrost regions includes a plurality of slope surface cooling blocks 1, a plurality of horizontal equilibrium condensing tubes 2, and a plurality of cooling flanges 3 and targeting heat pipe arrays 7. The plurality of slope surface cooling blocks 1 are arranged on the surface of subgrade slope 4 and abutment conical slope 5 to form an upper heat barrier layer and a lower cold storage layer; the plurality of horizontal equilibrium condensing tubes 2 are installed inside the abutment-back subgrade; the plurality of cooling flanges 3 are arranged on the side wall of the abutment; the targeting heat pipe arrays 7 are arranged on one side of the subgrade and close to the abutment foundation 6.

Wherein, the slope surface cooling block 1 is a multi-layer structure composed of a cover plate, partition plate and cold storage structure. See ZL202021920127.2 (Assembled Cooling Module for subgrade slope in Permafrost Regions) for its specific structure.

Refer to ZL201910610500.X (Evaporation Section Large-angle Nearly-horizontal Heat Pipe and Construction Method Thereof) for the specific structure of horizontal equilibrium condensing tube 2.

The slope surface cooling blocks 1 cover the entire surface of the abutment conical slope 5 and extend outward for 2 m~4 m along the natural ground surface at the slope angle. The slope surface cooling blocks 1 are arranged on the slope of the subgrade slope 4, and the laying length along the subgrade direction is 20 m~50 m behind the abutment.

The plurality of horizontal equilibrium condensing tubes 2 are arranged inside the horizontal subgrade of the subgrade behind abutment, and are staggered in upper and lower layers along the height of the embankment to form an overall balanced cooling of the fill subgrade base, which greatly improves the strength and bearing capacity of the base by significantly reducing the temperature of permafrost at the base. The horizontal spacing between the two layers of horizontal equilibrium condensing tube 2 is the same, which is 1 m~3 m. The horizontal equilibrium condensing tubes 2 in the lower layer are arranged at the bottom of the embankment, and the spacing between the upper and the lower horizontal equilibrium condensing tubes 2 is 0.5 m~2.0 m.

Each cooling flange 3 is vertically installed at the side wall of the abutment, and pasted or anchored by the thermal conductive adhesive; the horizontally adjacent cooling flanges 3 are in contact with each other, and the vertically adjacent cooling flanges 3 reserve a space for a heat release section. The thermal conductive adhesive is a conventional thermally conductive silica gel.

The cooling flange includes a shading flake 31, an insulation layer 32 and a heat pipe unit 33. One side of the shading flake 31 is exposed, and the other side thereof is connected with the insulation layer 32, and the insulation layer 32 is connected with the heat pipe unit 33; the heat pipe unit 33 is vertically adhered or anchored on the abutment side wall by the thermal conductive adhesive.

The shading flake 31 and the insulation layer 32 are adhered together by a thermal insulation adhesive, and the heat insulation layer 32 is fixedly connected to the heat pipe unit 33 by the thermal insulation adhesive. Thermal insulation adhesive can be selected as thermal insulation glue.

The shading flake 31 is I-shaped or Z-shaped or rectangular, made of metal materials, with a vertical height of 5 cm~15 cm and a horizontal width of 10 cm~30 cm.

The thickness of the insulation layer 32 is 5 cm~10 cm, and conventional industrial thermal insulation materials such as rock wool boards, EPS, XPS, etc. can be used.

The heat pipe unit 33 is formed by a plurality of miniature heat pipes arranged in parallel on the insulation layer 32 at intervals less than 1 cm, and a portion of the heat pipe unit 33 higher than the insulation layer 32 serves as an exothermic section. The exothermic section is curved from 0° to 60° with a height of 3 cm to 5 cm. The miniature heat pipe has an outer diameter of less than 1 cm and a thickness of less than 5 mm.

The targeting heat pipe array 7 consists of a plurality of variable-angle heat pipes in evaporation sections 72 arranged at the bridgehead; the evaporation section 72 is buried below the ground surface; and the condensation section 71 of the heat pipes is directly inserted above the ground surface at a vertical angle.

The plurality of heat pipes are distributed in an approximately symmetrical fan shape along the toe line 51 of the abutment conical slope 5 with the center of the abutment foundation 6 as the axis, and the spacing between the heat pipes is 0.5 m~2.0 m. The vertical projections of all the evaporation sections 71 are directed towards the abutment foundation 6, thereby constituting a target area with the abutment foundation 6 as an axis.

The evaporation section 72 faces the abutment foundation 6, and a horizontal projection position of an end of the evaporation section 72 is located outside the abutment foundation 6; at the same time, the evaporation section 72 and the condensation section 71 form an included angle of α, α=90°~180°. The included angle α between the evaporation section 72 and the condensation section 71 is different according to different positions, so as to further surround the abutment foundation 6.

The included angle α is determined as follows:

$$\alpha = \arccos\left(\frac{l}{L}\right);$$

Where: l is the horizontal distance from the buried position of the heat pipe to the outer side of the abutment foundation 6; L is the length of the evaporation section 72.

The targeting heat pipe arrays 7 are irregular rows of heat pipes. In the engineering implementation case, the targeting heat pipe arrays 7 are successively spread out at intervals along the strike of the toe line of the abutment conical slope 5, with a horizontal spacing of 1 m~4 m.

Working Principles:

The slope surface cooling block 1 mainly regulates and controls the road-bridge transition section from the heat absorption surfaces of the subgrade slope and abutment conical slope 5, which has comprehensive functions such as blocking solar radiation, convective heat transfer cooling and energy storage. The roof of the slope surface cooling block 1 effectively shields and absorbs the radiant heat from the sun and surrounding environment, thus preventing the radiant heat from directly entering the regulating structure. The roof and the middle partition plate form an upper convective heat exchange channel, which brings the heat of the roof out of the regulating structure through convective heat exchange, thus reducing the secondary radiation heat of the top plate. The partition plate is mainly composed of a radiation reflection layer and an insulation layer, which plays a role in blocking the secondary radiant heat from the roof. The cool storage layer mainly reduces the temperature of the subgrade slope by regulating convection and evaporation heat absorption.

The horizontal equilibrium condensing tube 2 cools the embankment bottom through phase change convection heat exchange. At a relatively low external temperature, the condensing tube is in working condition, its evaporation section absorbs heat, and the internal liquid working medium is in a continuous vaporization phase transition process. The vapor working medium continuously enters the vertical condensation section through the upper space and channel under pressure. Affected by the external low-temperature environment, the tube wall temperature of the condensation section is relatively low. The vaporous working medium releases heat in the condensation section and condenses on the tube wall to turn into a liquid working medium, which falls to the collector under the action of gravity, enters the return conduit to generate pressure, and flows back to the evaporation section under the push of pressure. In this way, the purpose of continuous regulation and control of subgrade ground temperature is realized through continuous circulation of the working medium. Under the condition that there is a ground temperature difference in different parts inside the subgrade of the evaporation section, the horizontal equilibrium condensing tube 2 can automatically balance the evaporation intensity, thus forming the uniformity of overall cooling.

Figure 5:
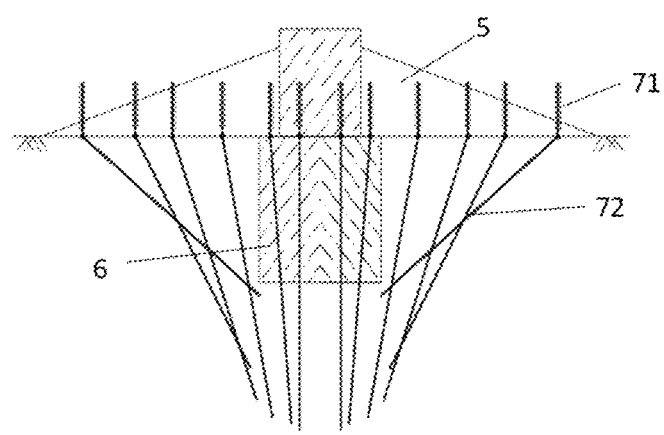
FIG. 5 is an overall side view of the heat pipe array of the present invention.
Figure 6:
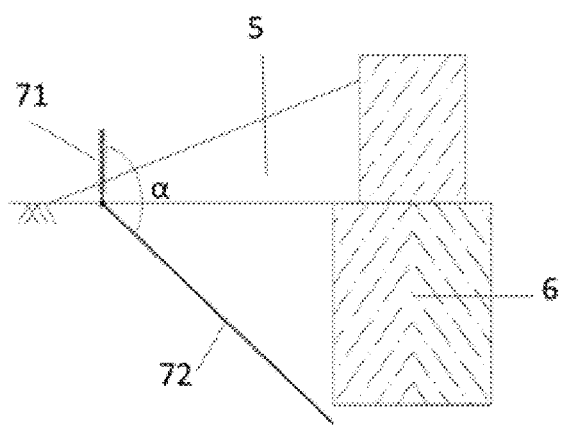
FIG. 6 is a side view of the variable angle heat pipe in the evaporation section of the present invention.

The "targeting effect" in the targeting heat pipe arrays 7 refers to the special design and arrangement of the spatial position and evaporation angle of each heat pipe of the heat pipe array, so as to achieve the purpose of accurately and efficiently cooling down targets such as abutment foundation 6. Further, as shown in FIG. 5, the installation holes for all heat pipes are approximately formed with the geometric center of the abutment foundation 6 as the circle center, and the horizontal projections of all evaporation sections 72 point to the abutment foundation 6. As shown in FIG. 6, the targeting heat pipe arrays 7 are arranged nearly symmetrically along the left and right sides with the center line of the abutment foundation 6 as the axis of symmetry; through the above implementation, a spatial encircling arrangement facing the abutment foundation 6 is presented in space. In this way, the purpose of targeted cooling of permafrost foundation at the bottom of abutment foundation 6 is achieved.

The cooling flange 3 is used for the abutment side wall and has a multi-layer cooling structure. The contact between the cooling flange 3 and the environment can effectively reflect the radiant heat of the sun and the environment, and after it has been installed on the side wall, a vertical convective heat exchange channel will be formed between the shading flakes 31 to take away the heat inside the cooling flange 3 in time through natural convection heat exchange effect. The insulation layer 32 connected to the shading flake 31 further insulates external heat and secondary radiation heat of the shading flake 31. The other side of the insulation layer 32 is a heat pipe unit 33, which directly contacts with the sidewall. When the ambient temperature is lower than the side wall temperature, the heat pipe unit 33 starts cooling to rapidly decrease the side wall temperature. When the ambient temperature is high, the heat pipe unit 33 stops working and the entire cooling flange 3 serves as insulation. In this way, the cooling flange 3 can block the heat absorption channel of the side wall and continuously accumulate ambient cold energy into the foundation through the abutment side wall.

To sum up, the integrated technology of the present invention mainly performs ground temperature and freezing-thawing regulation and control from the three-dimensional whole of the embankment surface, embankment interior and bottom and foundation interior according to the complex heat transfer characteristics of the road-bridge transition section, and finally achieves the purpose of the overall stability of transition section by effectively combining the above respective key technologies.

EMBODIMENT

Figure 7:
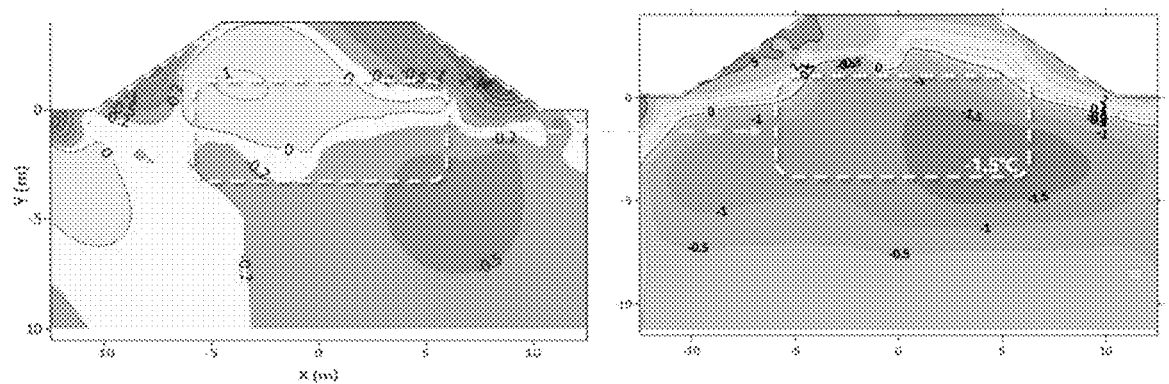
FIG. 7 shows the measured results of geothermal field distribution in the road-bridge transition section in permafrost regions of the present invention.

The field test demonstration was carried out in the damage management of a road-bridge transition section of the Qinghai-Tibet Railway by using the integrated technology of the present invention, and the permafrost underlying the subgrade was monitored. The field monitoring results after one year of implementation are shown in FIG. 7. In the figure, the left part shows the ground temperature cross-section of the subgrade behind the abutment before the measures were implemented in October 2021, and the right part shows the ground temperature comparison cross-section after 1 year of implementation of the measures in October 2022. It can be seen from the comparison that:

1. The nature of the geothermal field has changed fundamentally. The base of the subgrade is rapidly transformed from the melting area and high-temperature permafrost before implementation to the low-temperature permafrost area with ground temperature lower than $-1.0°$ C.;

2. The shape of the geothermal field has changed significantly. The frozen area is changed from the melting of most areas of the embankment and base before implementation to the complete freezing of the base and most areas of the embankment;

3. The mechanical properties and embankment stability are effectively guaranteed. (1) The temperature of permafrost foundation drops below $-1.0°$ C., which is low-temperature permafrost and meets the mechanical stability requirements; (2) Most areas of the embankment behind the abutment remain frozen, effectively eliminating the horizontal thrust behind the abutment.

It can be seen from the above observation results that through the implementation of integrated technology, the geothermal field and freezing-thawing change process of subgrade have been fundamentally changed, thus effectively eliminating the freezing-thawing problem of subgrade and ensuring the long-term stability of subgrade.

What is claimed is:

1. An integrated structure for damage management of road-bridge transition sections in permafrost regions, comprising a plurality of slope surface cooling blocks (1), a plurality of horizontal equilibrium condensing tubes (2), and a plurality of cooling flanges (3) and targeting heat pipe arrays (7);
wherein the plurality of slope surface cooling blocks (1) are arranged on the surfaces of the subgrade slope (4) and the abutment conical slope (5);
the plurality of horizontal equilibrium condensing tubes (2) are installed inside the abutment-back subgrade;
the plurality of said cooling flanges (3) are arranged on the abutment side wall;
the targeting heat pipe arrays (7) are arranged on one side of the subgrade, consisting of a plurality of variable-angle heat pipes in evaporation sections (72), wherein the evaporation section (72) is buried below the ground surface, and the condensation section (71) of the heat pipes is directly inserted above the ground surface at a vertical angle, the plurality of heat pipes are distributed in an approximately symmetrical fan shape along the slope toe line of the abutment conical slope (5) with the center of the abutment foundation (6) as the axis;
wherein each cooling flange (3) is vertically installed at the side wall of the abutment, and pasted or anchored by thermal conductive adhesive; the horizontally adjacent cooling flanges (3) are in contact with each other, and the vertically adjacent cooling flanges (3) reserve a space for heat release section; wherein the cooling flange comprises a shading flake (31), an insulation layer (32) and a heat pipe unit (33); one side of the shading flake (31) is exposed, and the other side thereof is connected with the insulation layer (32), and the insulation layer (32) is connected with the heat pipe unit (33); the heat pipe unit (33) is vertically adhered or anchored on the abutment side wall by a thermal conductive adhesive.

2. The integrated structure for damage management of road-bridge transition sections in permafrost regions according to claim 1, wherein the slope surface cooling blocks (1) cover the entire surface of the abutment conical slope (5), and extend outward by 2 m~4 m along the natural ground surface at the slope angle.

3. The integrated structure for damage management of road-bridge transition sections in permafrost regions according to claim 1, wherein the slope surface cooling blocks (1) are arranged on the surface of the subgrade slope (4), and the laying length along the subgrade direction is 20 m~50 m behind the abutment.

4. The integrated structure for damage management of road-bridge transition sections in permafrost regions according to claim 1, wherein the plurality of horizontal equilibrium condensing tubes (2) are arranged inside the horizontal subgrade behind the abutment and staggered in upper and lower layers along the height of embankment; the horizontal spacings of the horizontal equilibrium condensing tubes (2) in the two layers are the same, both being 1 m~3 m; the horizontal equilibrium condensing tubes (2) in the lower layer are arranged on the bottom surface of the embankment, and a spacing between the horizontal equilibrium condensing tubes (2) in the upper and lower layers is 0.5 m~2.0 m.

5. The integrated structure for damage management of road-bridge transition sections in permafrost regions according to claim 1, wherein the evaporation section (72) faces the abutment foundation (6), and a horizontal projection position of an end of the evaporation section (72) is located outside the abutment foundation (6); at the same time, the evaporation section (72) and the condensation section (71) form an included angle of α, α=90°~180°.

6. The integrated structure for damage management of road-bridge transition sections in permafrost regions according to claim 5, wherein the included angle α is determined by the following formula:

$$\alpha = \arccos\left(\frac{l}{L}\right);$$

where: l is the horizontal distance from the buried position of the heat pipe to the outer side of the abutment foundation (6); L is the length of the evaporation section (72).

* * * * *